United States Patent Office 3,325,481
Patented June 13, 1967

3,325,481
3-(OPTIONALLY SUBSTITUTED)AMINO-ESTRA-1,3,
5(10),8(9),14-PENTAEN - 17 - ONES AND DERIVA-
TIVES THEREOF
Raphael Pappo, Skokie, Ill., assignor to G. D. Searle &
Co., Chicago, Ill., a corporation of Delaware
No Drawing. Filed Oct. 22, 1965, Ser. No. 502,374
Claims priority, application Great Britain, Sept. 30, 1965,
41,605/65, 41,606/65
18 Claims. (Cl. 260—239.5)

This application is a continuation-in-part of my copending applications Ser. No. 401,223, filed Oct. 2, 1964, now abandoned, Ser. No. 494,930, filed Oct. 11, 1965, and Ser. No. 502,373, filed Oct. 22, 1965.

The present invention relates to a novel process for the manufacture of 19-norsteroids and to novel intermediates utilized in that process.

A starting material suitable for utilization in the instant process is 6-amino-1-tetralone, which is described by Allinger and Jones, J. Org. Chem. 27, 70 (1962). In the initial step of the instant process, that starting material is contacted with a vinyl organometallic reagent, preferably in a suitable organic solvent medium such as diethyl ether, dibutyl ether, tetrahydrofuran, etc., to afford 6-amino-1-vinyl-1-tetralol. Alternatively, 6-amino-1-tetralone or 6-amino-1-vinyl-1-tetralol is converted to an intermediate wherein the amino group has been alkylated or acylated. The particuluar intermediates envisaged are illustrated by the 1-vinyl-1-tetralols of the following structural formula

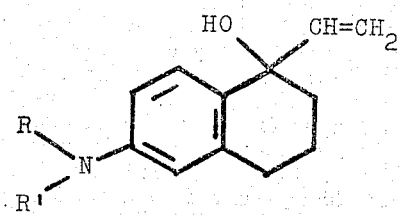

wherein R and R' are selected from the group consisting of hydrogen, hydrocarbon, (hydroxy-substituted)hydrocarbon, (amino-substituted)hydrocarbon, acyl and hydrocarbon-sulfonyl radicals and R and R' together can comprise the residue of a cycloaliphatic amine.

The hydrocarbon radicals indicated in the foregoing structural representation may be lower alkyl radicals such as methyl, ethyl, propyl, butyl, pentyl, hexyl, heptyl and the branched-chain groups isomeric therewith, aryl radicals such as phenyl, tolyl, and xylyl, or aralkyl radicals such as benzyl and phenethyl. Representative of the acyl radicals depicted therein are lower alkanoyl groups such as acetyl, propionyl, butyryl, valeryl, caproyl, heptanoyl and the branched-chain radicals isomeric therewith and aroyl groups such as benzoyl, toluoyl, and xyloyl. The hydrocarbon-sulfonyl radicals are exemplified by p-toluenesulfonyl, benzenesulfonyl and methanesulfonyl. Examples of the cycloaliphatic amines whose residues R and R' can represent are pyrrolidine, piperlidine, morpholine, pipecoline, piperazine and hexamethylenimine. Their preparation is described in my copending application Ser. No. 494,930, filed Oct. 11, 1965.

When the above described 1-vinyl-1-tetralols are alkylated with a 2-alkylcyclopentane-1,3-dione in the presence of a suitable alkaline catalyst such as potassium hydroxide, sodium hydroxide or triethylamine there is produced, depending upon the length of reaction, a tricyclic dione of the structural formula

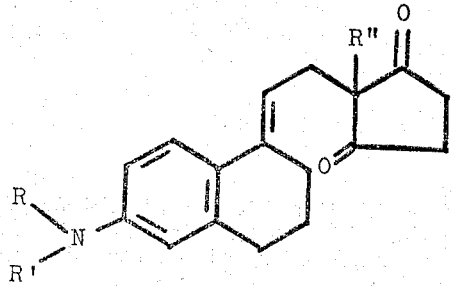

or a tetracyclic 14-hydroxy-17-one of the structural formula

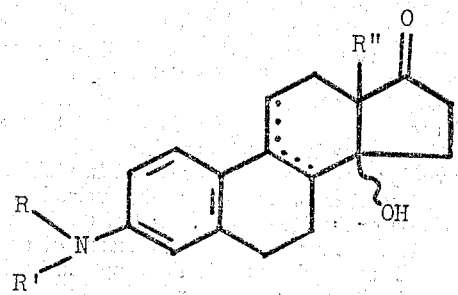

wherein R and R' are as hereinbefore defined, R'' is a lower alkyl radical as hereinbefore exemplified, the dotted lines are indicative of a double bond linking carbon 9 to an adjacent C-ring carbon atom and the wavy line denotes the alternative α or β configuration at carbon 14. The preparation of the latter substances is disclosed in my copending application Ser. No. 502,373, filed Oct. 22, 1965.

When the aforementioned tricyclic or 14-hydroxy tetracyclic intermediates are dehydrated, the corresponding tetracyclic pentaenes of the following structural formula

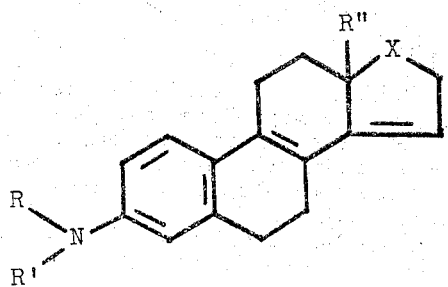

are produced. In that structural representation, the terms R, R' and R'' are as hereinbefore defined, and X can be a carbonyl, hydroxymethylene or ketalized carbonyl group. In the instances where X represents a carbonyl group, these intermediates may be reduced by the method described hereinbefore to afford the corresponding 17-hydroxy compounds or may be contacted with a mono- or dihydric alcohol by the procedure described hereinbefore to afford the corresponding 17-ketals. This dehydration process is preferably conducted in an organic solvent medium in the presence of a strong acid catalyst. Thus, 2 - methyl - 2 - (6-pyrrolidino-1-naphthyliden)ethylcyclopentane-1,3-dione is heated in benzene with p-toluenesulfonic acid to yield 3-pyrrolidinoestra-1,3,5(10),8(9),14-pentaen-17-one.

The aforementioned 1,3,5(10),8(9),14-pentaenes can be selectively hydrogenated to afford the corresponding 1,3,5(10),8(9)-tetraenes of the following structural formula

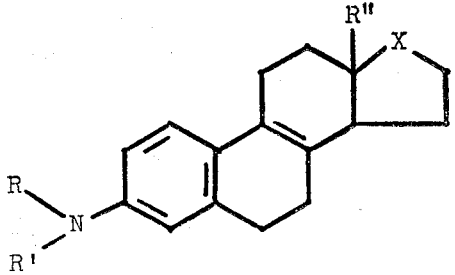

wherein R, R', R'' and X are as hereinbefore defined. The aforementioned 3-pyrrolidinoestra-1,3,5(10),8(9),14-pentaen-17-one, for example, in a solution of benzene and pyridine, is shaken in a hydrogen atmosphere in the presence of 5% palladium-on-calcium carbonate catalyst, thus producing 3-pyrrolidinoestra-1,3,5(10),8(9)-tetraen-17-one. The tetraen-17-ones encompassed by the latter structural formula are similarly converted to the corresponding 17-hydroxy and 17-ketal derivatives by methods analogous to those described hereinbefore. The tetraenes of the latter structural formula are useful also as anti-fungal and anti-protozoal agents in view of their ability to inhibit the growth of such organisms as *Trichophyton mentagrophytes* and *Tetrahymena gelleii*. In addition, they are inhibitors of dicotyledonous seed germination.

Reduction of the 8(9) double bond of the latter intermediates is conveniently effected by means of an alkali metal-liquid ammonia combination, optionally in the presence of aniline. Particularly suitable alkali metals are sodium, potassium and lithium. By that process, there are produced the 1,3,5(10)-trienes of the following structural formula

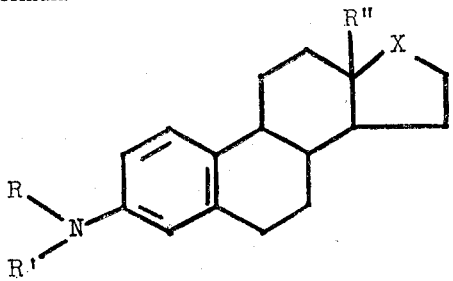

wherein R, R', R'' and X are as hereinbefore defined. As a specific example, 3-pyrrolidinoestra-1,3,5(10),8(9)- tetraen-17β-ol in tetrahydrofuran containing aniline is allowed to react with sodium and liquid ammonia to produce 3-pyrrolidinoestra-1,3,5(10)-trien-17β-ol.

Reduction of either the instant 1,3,5(10),8(9)-tetraenes or the 1,3,5(10)-trienes with an alkali metal and liquid ammonia results in the 2,5(10)-dienes of the following structural formula

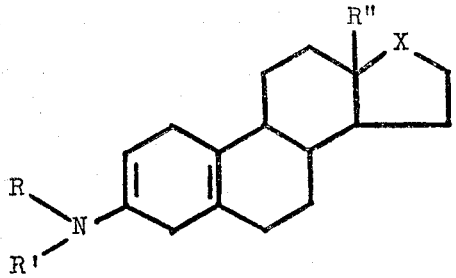

wherein R, R', R'' and X are as hereinbefore defined.

Thus, either 3-dimethylaminoestra-1,3,5(10)-trien-17β-ol or 3 - dimethylaminoestra-1,3,5(10),8(9)-tetraen-17β-ol, when contacted with lithium metal and liquid ammonia in tetrahydrofuran containing tertiary-butyl alcohol, affords 3-dimethylaminoestra-2,5(10)-dien-17β-ol.

Careful acid hydrolysis of the latter 2,5(10)-diene intermediates affords the corresponding 3-keto-$\Delta^{5(10)}$ compounds of the following structural formula

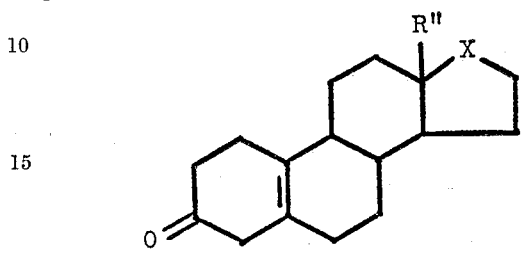

wherein R'' and X are as hereinbefore defined. The latter substances are known intermediates to pharmacologically useful compounds. The hydrolysis of 3-dimethylaminoestra-12,5(10)-dien-17one thus results in estr-5(10)-ene-3,17-dione, which is useful in the manufacture of 17α-ethynyl-17β-hydroxyestr-5(10)-en-3-one, a known progestational agent. More vigorous acid hydrolysis of the aforementioned 2,5(10)-diene intermediates affords the known 3-keto-$\Delta^4$ compounds of the following structural formula

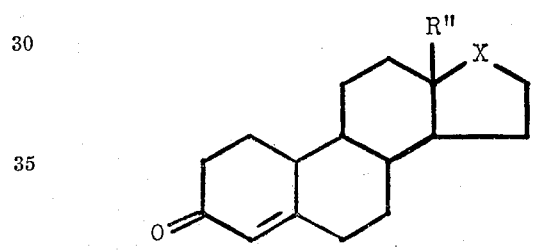

wherein R'' and X are as hereinbefore defined. The latter substances are useful as intermediates in the manufacture of known pharmacologically useful steroids possessing the 3-keto-$\Delta^4$ structure. The compounds of the latter structural formula wherein X is a ketalized carbonyl function are particularly useful intermediates in view of the stability of the ketal function to alkaline reagents. Thus, 3-dimethylaminoestra-2,5(10)-dien-17-one 17-dethyl ketal is contacted with aqueous sodium acetate in methanol to yield estr-4-ene-3,17-dione 17-diethyl ketal. Reduction of the 3-keto group is effected by reaction with lithium tri-(tertiary-butoxy) aluminum hydride in tetrahydrofuran, thus affording 3β-hydroxyestra-4-en-17-one 17-diethyl ketal, and the 17-ketal function is removed by reaction with aqueous acetic acid to yield 3β-hydroxyestr-4-en-17-one. Ethynylation of the latter substance followed by acetylation of the resulting 17α-ethynylestr-4-ene-3β,17β-diol affords the known pharmacologically useful 17α-ethynylestra-4-ene-3β,17β-diol 3,17-diacetate.

The product of the instant process described hereinbefore are obtained as *dl*-mixtures. The individual *d* and *l* enantiomorphs are obtained, however, by resolution techniques involving salt formation between the 3-amino moiety and an optically active acid. Suitable acids for this purpose are exemplified by *d*-camphorsulfonic, *d*-α-bromocamphorsulfonic, *l*-malic, *l*-mandelic, *l*-menthoxyacetic, *d* and *l*-tartaric, *d* and *l*-diacetyltartaric and *d* and *l*-dibenzoyltartaric acid. Thus, *dl*-3-dimethylaminoestra-1,3,5(10),8(9),14-pentaen-17β-ol is contacted with *d*-dibenzoyltartaric acid to afford the amine salt, which is decomposed with aqueous sodium hydroxide in methanol to yield levorotatory 3-dimethylaminoestra-1,3,5(10),8(9),14-pentaen-17β-ol. An alternative procedure for obtaining the instant optically active compounds involves the use of an optically active reagent to effect an asymmetric synthesis. As a specific example, 2-methyl-2-(6-dimethylamino - 1-naphthyliden)ethylcyclopentane-1,3-dione is heated in benzene with d-camphorsulfonic acid to afford levorotatory 3 - dimethylaminoestra - 1,3,5(10),8(9),14-pentaen-17-one.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

*Example 1*

A mixture of 8.67 parts of 2-methyl-2-(6-pyrrolidino-1-naphthyliden)ethylcyclopentane - 1,3-dione with 198 parts of benzene containing 0.375 part of p-toluenesulfonic acid monohydrate is heated at the reflux temperature, under nitrogen, for about one hour, then is cooled and stirred with excess aqueous sodium hydroxide. The organic layer is separated by decantation, then is washed with water, dried over anhydrous sodium sulfate and stripped of solvent by distillation under reduced pressure to afford the crude crystalline product. That material is dissovled in a 1:1 mixture of ethyl alcohol and benzene, then is decolorized with activated carbon and filtered. The brownish filtrate is concentrated to a small volume, then is diluted with ether and allowed to crystallize. The resulting pure 3-pyrrolidinoestra-1,3,5(10),8(9),14-pentaen-17-one melts at about 173–175° and is characterized by the following structural formula

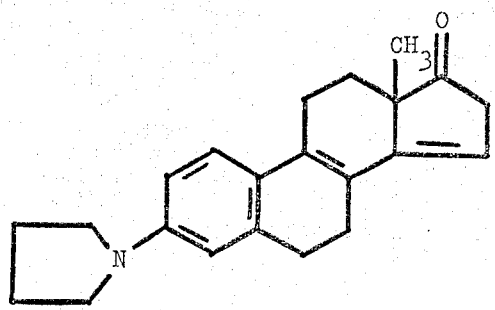

*Example 2*

To a solution of 2 parts of 3-pyrrolidinoestra-1,3,5(10), 8(9),14-pentaen-17-one in 200 parts by volume of a 20% pyridine in benzene solution is added two parts of 5% palladium-on-calcium carbonate catalyst, and that mixture is shaken with hydrogen at atmospheric pressure and room temperature until one molecular equivalent of hydrogen has been absorbed. The catalyst is then removed by filtration, and the solvent is distilled under reduced pressure to afford a residue, which is purified by recrystallization first from benzene then from ethanol-acetone to produce 3-pyrrolidinoestra-1,3,5(10),8(9)-tetraen-17-one, melting at about 181–185°. This compound is represented by the following structural formula

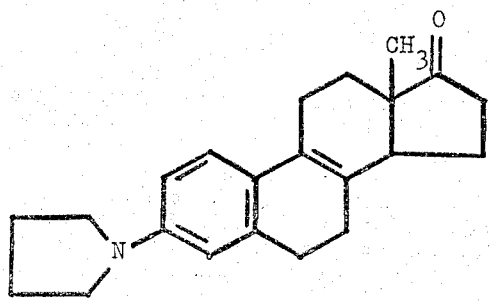

*Example 3*

To a mixture of 1.2 parts of lithium aluminum hydride with 13.5 parts of tetrahydrofuran is added a solution of 2 parts of 3-pyrrolidinoestra-1,3,5(10),8(9),14-pentaen-17-one in 18 parts of tetrahydrofuran. The resulting reaction mixture is stirred at room temperature for about 7 hours, then is stirred and diluted successively with 1.2 parts of water, 7.2 parts of tetrahydrofuran, 1.2 parts by volume of 10% aqueous sodium hydroxide and 2 parts of water. That mixture is diluted with ether and filtered to remove a small amount of insoluble material. The filtrate thus obtained is concentrated by distillation under reduced pressure, and the resulting residue is purified by recrystallization from benzene to afford 3-pyrrolidinoestra-1,3,5(10), 8(9),14-pentaen-17β-ol, melting at about 188–190°. It is represented by the following structural formula

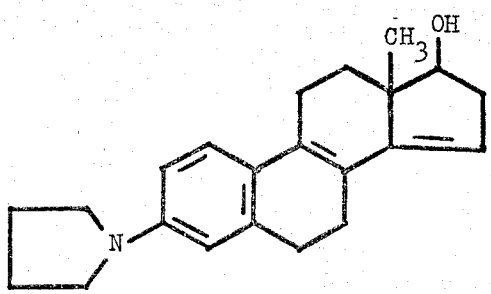

*Example 4*

*Method A.*—A mixture of 1.2 parts of 3-pyrrolidinoestra-1,3,5(10),8(9),14-pentaen-17β-ol, one part of 5% palladium-on-calcium carbonate catalyst and 100 parts by volume of 20% pyridine in benzene is stirred with hydrogen at room temperature and atmospheric pressure for about 3 hours. Following that reaction period, the catalyst is removed by filtration, and the filtrate is concentrated to dryness under reduced pressure. The residual solid is recrystallized from methanol to afford 3-pyrrolidinoestra-1,3,5(10),8(9)-tetraen-17β-ol, melting at about 144–149°.

*Method B.*—To a mixture of 4 parts of lithium aluminum hydride with 45 parts of tetrahydrofuran is added a solution of 6 parts of 3-pyrrolidinoestra-1,3,5(10),8(9)-tetraen-17-one in 180 parts of tetrahydrofuran. The resulting reaction mixture is stirred at room temperature for about 6 hours, after which reaction period there is added successively 4 parts of water dissolved in 27 parts of tetrahydrofuran, 4 parts by volume of 10% aqueous sodium hydroxide and 7 parts of water. Dilution of that mixture followed by filtration and evaporation of the solvent under reduced pressure affords, after recrystallization from ethanol, 3-pyrrolidinoestra-1,3,5(10),8(9)-tetraen-17β-ol, melting at about 144–149°. This substance is identical with the product obtained by the procedure described in Method A.

*Example 5*

When an equivalent quantity of 2-methyl-2-(6-morpholino-1-naphthyliden)ethylcyclopentane-1,3-dione is substituted in the procedure of Example 1, there is obtained 3-morpholinoestra-1,3,5(10),8(9),14-pentaen-17-one, characterized by the following structural formula

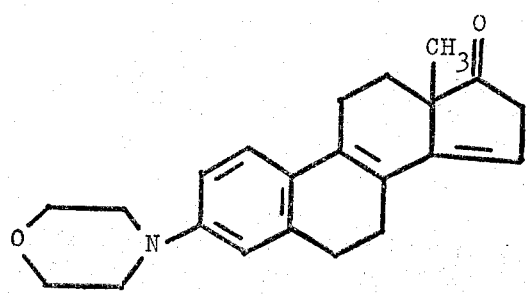

Example 6

A mixture consisting of 31.36 parts of 2-methyl-2-(6-dimethylamino-1-naphthyliden)ethylcyclopentane-1,3-dione, 1.57 parts of p-toluenesulfonic acid monohydrate and 827 parts of benzene is heated and stirred at the reflux temperature in a nitrogen atmosphere for about 75 minutes, then is cooled to 0–5° by means of an ice bath. Dilution with benzene affords an organic solution which is washed successively with 5% aqueous sodium bicarbonate and water until neutral, then is dried over anhydrous sodium sulfate and evaporated to dryness by distillation under reduced pressure. The resulting crystalline residue is purified by recrystallization from acetone to afford 3-dimethylaminoestra-1,3,5(10),8(9),14-pentaen-17-one, melting at about 183–185.5°. This compound exhibits ultraviolet absorption maxima at about 236 and 337 millimicrons with molecular extinction coefficients of about 13,600 and 30,520, respectively. It is further characterized by the following structural formula

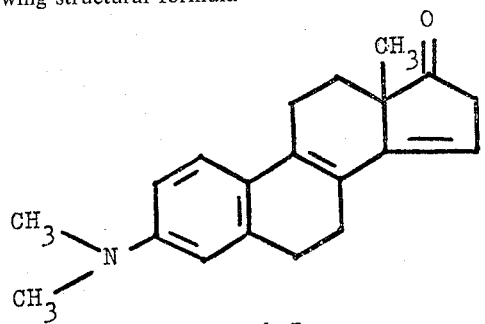

Example 7

To a mixture of 0.32 part of lithium aluminum hydride with 11.9 parts of tetrahydrofuran, under nitrogen, is added dropwise with stirring at room temperature a solution of 2 parts of 3-dimethylaminoestra-1,3,5(10),8(9),14-pentaen-17-one in 27 parts of tetrahydrofuran. The reaction mixture is stirred for about 7 hours longer, then is diluted with approximately 35 parts of ether and cooled to approximately −10°. That mixture is diluted successively with a solution of 0.32 part of water in 7.2 parts of tetrahydrofuran, 0.32 part by volume of 5% aqueous sodium hydroxide and 1.92 parts of water. The precipitate which forms is collected by filtration and washed well on the filter with ether. Distillation of the solvent from the filtrate under reduced pressure affords a residual foam-like material, which is crystallized from ether to afford 3-dimethylaminoestra - 1,3,5(10),8(9),14 - pentaen-17β-ol, melting at about 139–143°. A pure substance, melting at about 142–144.5°, is obtained by a second recrystallization from benzene. It displays ultraviolet absorption maxima, in methanol, at about 236 and 334 millimicrons with molecular extinction coefficients of about 14,470 and 31,900, respectively, and is characterized further by the following structural formula

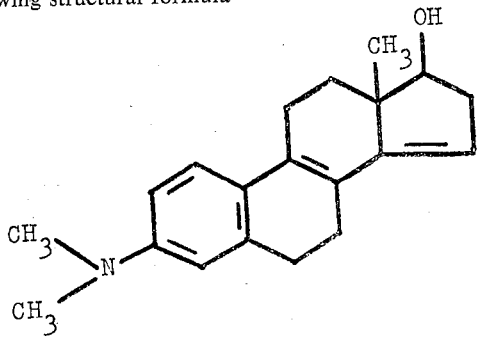

Example 8

To a solution of 14 parts of 3-dimethylaminoestra-1,3,5(10),8(9),14-pentaen-17-one in 1,000 parts by volume of 20% pyridine in benzene is added 14 parts of 5% palladium-on-calcium carbonate catalyst, and that reaction mixture is stirred with hydrogen at atmospheric pressure and room temperature for about 2 hours. Removal of the catalyst by filtration followed by evaporation of the filtrate to dryness under reduced pressure affords a crystalline residue, which is purified by recrystallization from acetone-ethanol, thus producing 3-dimethylaminoestra-1,3,5(10),8(9)-tetraen-17-one, melting at about 164–167°. An additional recrystallization from acetone-ethanol affords the pure substance, melting at about 174–178°. It is represented by the following structural formula

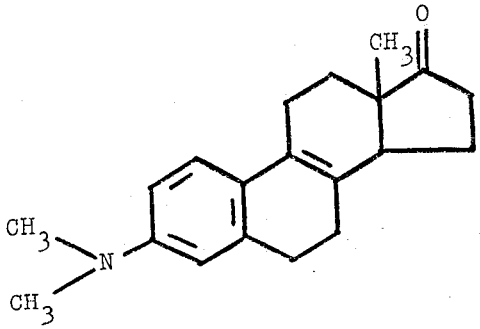

Example 9

*Method A.*—To a mixture of 0.16 part of lithium aluminum hydride with 6 parts of tetrahydrofuran, under nitrogen, is added rapidly at room temperature a solution of one part of 3-dimethylaminoestra-1,3,5(10),8(9)-tetraen-17-one in 13.5 parts of tetrahydrofuran. The reaction mixture is stirred at room temperature for about 6½ hours, then is diluted with approximately 15 parts of ether and cooled to about −10°. Successive addition of a solution of 0.16 part of water in 2.6 parts of tetrahydrofuran, 0.16 part by volume of 5% aqueous sodium hydroxide and 0.96 part of water results in formation of a precipitate, which is collected by filtration and washed well on the filter with ether. The filtrate is evaporated to dryness under reduced pressure, and the foam-like residue is crystallized from ether to afford 3-dimethylaminoestra-1,3,5(10),8(9)-tetraen-17β-ol, melting at about 157–160.5°, and represented by the following structural formula

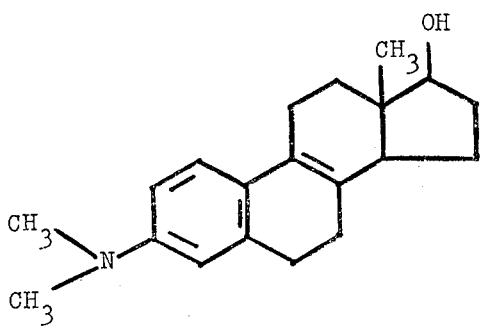

*Method B.*—A mixture containing 6.1 parts of 3-dimethylaminoestra - 1,3,5(10),8(9),14-pentaen-17β-ol, 50 parts of pyridine, 176 parts of benzene and 6 parts of 5% palladium-on-calcium carbonate catalyst is shaken with hydrogen at atmospheric pressure and room temperature for about 20 minutes, during which time one molecular equivalent of hydrogen is absorbed. Filtration of the reaction mixture in order to remove the catalyst, followed by evaporation of the filtrate to dryness under reduced pressure affords the crude product as an oil. Crystallization of that oily material from ether affords pure 3-dimethylaminoestra - 1,3,5(10),8(9) - tetraen - 17β - ol, melting at about 159–160.5°. An ultraviolet absorption maximum, in methanol, is observed at about 297.5 millimicrons with a molecular extinction coefficient of about 22,840. This compound is identical with the product obtained by Method A.

Example 10

A solution of 1.32 parts of 3-dimethylaminoestra-1,3,5(10),8(9)-tetraen-17-one in 11.4 parts of benzene is added to a stirred mixture of 10.4 parts of methanol, 1.22 parts of camphorsulfonic acid and 3.9 parts of trimethylorthoformate, under nitrogen. The resulting reaction mixture is allowed to stand at room temperature for about one hour, then is diluted with benzene and washed successively with 5% aqueous sodium hydroxide and water until neutral. Drying of that solution over anhydrous sodium sulfate followed by distillation of the solvent under reduced pressure affords a bluish-green oily residue which crystallizes upon standing. Recrystallization of that crude product from pentane afford crystals of 3-dimethylaminoestra - 1,3,5(10),8(9)-tetraen-17-one 17-dimethyl ketal, melting at about 75–80°. This compound exhibits an ultraviolet absorption maximum, in methanol, at about 296.5 millimicrons with a molecular extinction coefficient of about 22,880. It is represented by the following structural formula

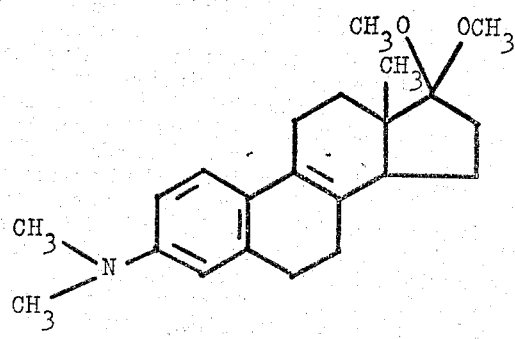

Example 11

To a mixture of 40 parts of ethanol, 4.6 parts of camphorsulfonic acid and 14.1 parts of triethyl orthoformate, under nitrogen, is added with stirring a solution of 5 parts of 3-dimethylaminoestra-1,3,5(10),8(9)-tetraen-17-one in 44 parts of benzene, and that reaction mixture is kept at room temperature for about 3½ hours. At the end of that time an additional 2.9 parts of triethyl orthoformate is added and the mixture is stored for approximately 2 hours longer. An additional 1.9 parts of triethly orthoformate is then added and, after approximately 45 minutes has elapsed, the reaction mixture is diluted with benzene, then is washed successively with 5% aqueous sodium hydroxide and water until neutral. Drying over anhydrous sodium sulfate followed by distillation of the solvent under reduced pressure affords, as a greenish oil, 3 - dimethylaminoestra-1,3,5(10),8(9)-tetraen-17-one 17-diethyl ketal, characterized by an ultraviolet absorption maximum, in methanol, at about 297 millimicrons with a molecular extinction coefficient of about 18,475.

Example 12

A mixture of one part of 3-dimethylaminoestra-1,3,5(10),8(9),14-pentaen-17β-ol, 10 parts of pyridine and 8 parts of acetic anhydride is kept at room temperature for about 16 hours, then is diluted with ice and water. The resulting aqeuous mixture is allowed to stand at room temperature for about 30 minutes, then is further diluted with water and extracted with benzene. The benzene layer is washer successively with 5% aqueuos sodium hydroxide and water, then dried over anhydrous sodium sulfate and stripped of solvent by distillation under reduced pressure. The oily residue is crystallized from methanol to afford pure 3-dimethylaminoestra-1,3,5(10),8(9),14-pentaen-17β-ol 17-acetate, melting at about 87–90°. Ultraviolet absorption maxima are observed in methanol, at about 236 and 331.5 millimicrons with molecular extinction coefficients of about 14,340 and 31,200, respectively.

Example 13

A mixture of 3 parts of 3-dimethylaminoestra-1,3,5(10),8(9),14-pentaen-17β-ol 17-acetate, 44 parts of benzene and 1.5 parts of 5% palladium-on-calcium carbonate catalyst is stirred in a hydrogen atmosphere at atmospheric pressure and room temperature until one molecular equivalent of hydrogen has been absorbed. Removal of the catalyst by filtration and evaporation of the solvent by distillation under reduced pressure affords a foamlike residue which is purified by recrystallization from ether to afford 3 - dimethylaminoestra - 1,3,5(10),8(9)-tetraen-17β-ol 17-acetate, melting at about 139–149°. This compound exhibits, in methanol, ultraviolet absorption maxima at about 225 and 297.5 millimicrons with molecular extinction coefficients of about 9,100 and 12,970, respectively.

Example 14

To a solution of 3.57 parts of d-dibenzoyltartaric acid in 49 parts of ether is added a solution of 2.86 parts of dl-3-dimethylaminoestra-1,3,5(10),8(9)-pentaen-17β-ol in 45 parts of chloroform, and that mixture is allowed to stand at room temperature for about 5 hours. The solid precipitate which forms is isolated by decantation of the supernatant, then is washed with benzene and dried to afford the amine salt, melting at about 170-174°. Recrystallization from isoproply alcohol raises the melting point to 187–189°. That salt is then dissolved in methanol, and the resulting solution is mixed with excess 5% aqueous sodium hydroxide. The precipitated amine is extracted with benzene, and the benzene solution is concentrated to dryness. The residual product is recrystallized from benzene to afford levorotatory 3-dimethylaminoestra-1,3,5(10),8(9),14-pentaen-17β-ol, melting at about 145–148° and exhibiting an optical rotation of −77°. The mother liquors from the latter crystallization are concentrated to dryness to afford a residue exhibiting an optical rotation of −52.5°.

When the foregoing process is repeated except that l-dibenzoyltartaric acid is utilized, dextrototatory 3-dimethylaminoestra - 1,3,5(10),8(9),14 - pentaen - 17β - ol is obtained.

Example 15

Method A.—To a solution of 3.2 parts of 2-methyl-2-(6-dimethylamino-1-napthyliden)ethylcyclopentane - 1,3-dione in 83.6 parts of benzene is added 0.19 part of d-camphorsulfonic acid, and the resulting mixture is stirred and heated at the reflux temperature, under nitrogen, for about 75 minutes. At the end of that time, the mixture is cooled to 0–5°, then is stirred with excess aqueous dilute sodium hydroxide. The organic layer is separated by decantation, then is washed successively with aqueous sodium hydroxide and water, dried over anhydrous sodium sulfate and evaporated to dryness under reduced pressure. Recrystallization of the residue from acetone affords levorotatory 3-dimethylaminoestra - 1,3,5(10),8(9)-14-pentaen-17β-one, characterized by an optical rotation, in chloroform, of −0.5°. The mother liquor from that recrystallization is evaporated to dryness to afford a residual solid possessing an optical rotation of −3°.

Method B.—A mixture containing 3.2 parts of 2-methyl-2-(6-dimethylamino-1-naphthyliden)ethylcyclopentane-1,3-dione, 0.19 part of d-camphorsulfonic acid and 83.6 parts of benzene is heated at the reflux temperature, under nitrogen, for about 2 hours, during which time approximately 5 parts by volume of distillate is collected. The reaction mixture is cooled to room temperature and washed successively with 5% aqueous sodium hydroxide and water until neutral, then dried over anhydrous sodium sulfate and distilled to dryness under reduced pressure.

The residual crystalline solid is recrystallized from acetone containing decolorizing carbon to afford levorotatory 3-dimethylaminoestra-1,3,5(10),8(9),14-pentaen-17-one, melting at about 179–182° and exhibiting an optical rotation, in chloroform, of −0.99°. Evaporation of the filtrate to dryness affords a crystalline residue exhibiting an optical rotation, in chloroform, of −61.5°. Recrystallization of that residue from acetone affords crystals of levorotatory 3-dimethylaminoestra-1,3,5(10),8(9),14-pentaen-17-one, melting at about 178–181°, and exhibiting an optical rotation of −1.5° in chloroform. The mother liquor from the latter recrystallization is evaporated to dryness to afford material exhibiting an optical rotation, in chloroform, of −106°.

*Method C.*—To a solution of one part of 2-methyl-2-(6-dimethylamino-1-naphthyliden)ethylcyclopentane-1,3-dione in 8.8 parts of benzene is added 3 parts of carbobenzoxy-L-phenylalanine, and the resulting mixture is allowed to stand at room temperature for about 96 hours, then is washed successively with aqueuous ammonia, aqueous sodium hydroxide and water. Evaporation of the mixture to dryness under reduced pressure affords a bluish residue, which is dissolved in acetone and decolorized by means of activated carbon. Distillation of the solvent under reduced pressure affords a residual solid, which is triturated with acetone to afford levorotatory 3-dimethylaminoestra-1,3,5(10),8(9),14-pentaen-17-one, characterized by an optical rotation of −1.00° in chloroform. The mother liquor from that crystallization is evaporated to dryness to afford a solid residue exhibiting an optical rotation, in chloroform, of −60.5°.

Example 16

To a solution of 1.3 parts of 1α-acetoxy-2-methyl-2-(6-dimethylamino-1-naphthyliden)ethylcyclopentan-3-one in 43.5 parts of toluene is added 26 parts of acetic acid, and the resulting mixture is heated at the reflux temperature, under nitrogen, for about 2 hours, then is cooled to 0–5° and diluted with benzene. The resulting organic solution is washed successively with ice cold aqueous sodium hydroxide and water, then dried over anhydrous sodium sulfate and evaporated to dryness under reduced pressure. Recrystallization of the resulting residue from methanol affords 3-dimethylaminoestra-1,3,5(10),8(9),14-pentaen-17α-ol 17-acetate, melting at about 123–125°.

Example 17

To a solution of 1.1 parts of 3-dimethylaminoestra-1,3,5(10),8(9),14-pentaen-17α-ol 17-acetate in 80 parts of methanol is added 10 parts by volume of 10% aqueous sodium hydroxide, and the resulting reaction mixture is allowed to stand at room temperature for about 16 hours, then is stripped of solvent by distillation under reduced pressure. The residual solid is recrystallized from ether to afford 3-dimethylaminoestra-1,3,5(10),8(9),14-pentaen-17α-ol, melting at about 114–115°.

Example 18

A mixture containing 9 parts of 2-methyl-2-(6-acetamido-1-naphthyliden)ethylcyclopentane-1,3-dione, 0.9 part of p-toluenesulfonic acid monohydrate and 198 parts of benzene is stirred at the reflux temperature for about 30 minutes, in a nitrogen atmosphere, during which time the water of reaction is removed azeotropically. That reaction mixture is then cooled to 0–5° and washed successively with cold dilute aqueous sodium hydroxide and water until neutral. Drying over anhydrous sodium sulfate followed by distillation of the solvent under reduced pressure affords a foam-like residue, which is recrystallized twice from benzene to afford 3-acetamidoestra-1,3,5(10),8(9),14-pentaen-17-one, melting at about 207–210°. Ultraviolet absorption maxima are observed at about 237 and 320 millimicrons with molecular extinction coefficients of about 8,240 and 18,370, respectively. This compound is represented by the following structural formula

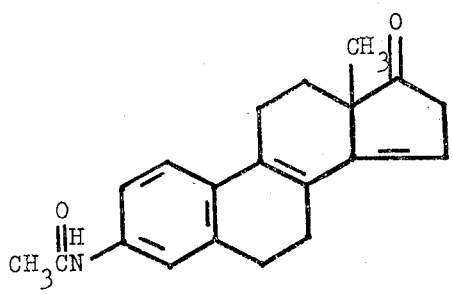

Example 19

To a solution of 4.86 parts of lithium tri-(tertiary-butoxy) aluminum hydride in 72 parts of tetrahydrofuran, in a nitrogen atmosphere, is added rapidly at room temperature a solution of 2.68 parts of 3-acetamidoestra-1,3,5(10),8(9),14-pentaen-17-one in 145 parts of tetrahydrofuran. The reaction mixture is stirred for about 6½ hours, then is poured with stirring into 1,000 parts of a mixture of ice and water containing 57.8 parts of acetic acid. Stirring is continued for about 10 minutes, following which time the mixture is diluted with water, then extracted with chloroform. The chloroform extracts are combined, then washed successively with 5% aqueous sodium bicarbonate and water until neutral. That neutral organic solution is dried over anhydrous sodium sulfate, then evaporated to dryness under reduced pressure, and the residual foam-like material is crystallized from aqueous ethanol to afford crystalline 3-acetamidoestra-1,3,5(10),8(9),14-pentaen-17β-ol monohydrate, melting at about 120–140° then resolidifying and remelting at 218–231°. This compound exhibits ultraviolet absorption maxima in methanol at about 238, 320 and 334 millimicrons with molecular extinction coefficients of about 7,920, 17,420 and 12,930, respectively.

Example 20

To a solution of 1.82 parts of 3-acetamidoestra-1,3,5(10),8(9),14-pentaen-17-one in 200 parts by volume of 20% pyridine in benzene is added 1.82 parts of 5% palladium-on-calcium carbonate catalyst, and the resulting mixture is shaken with hydrogen at atmospheric pressure and room temperature for about 5 hours. The catalyst is then removed by filtration, and the filtrate is evaporated to dryness under reduced pressure to afford a crystalline residue, which is purified by recrystallization from acetone, thus producing 3-acetamidoestra-1,3,5(10),8(9)-tetraen-17-one, melting at about 178–189°.

Example 21

*Method A.*—A mixture containing 2 parts of 3-acetamidoestra-1,3,5(10),8(9),14-pentaen-17β-ol, 2 parts of 5% palladium-on-calcium carbonate catalyst and 500 parts by volume of 20% pyridine in benzene is shaken with hydrogen at atmospheric pressure and room temperature for about 6 hours, during which time one molecular equivalent of hydrogen is absorbed. Removal of the catalyst by filtration followed by evaporation of the filtrate to dryness under reduced pressure affords the crude product as a crystalline residue. Further purification of that material by recrystallization from ethanol affords crystals of 3-acetamidoestra-1,3,5(10),8(9)-tetraen-17β-ol, melting at about 247–252°. An ultraviolet absorption maximum is observed at about 292.5 millimicrons with a molecular extinction coefficient at about 22,980.

*Method B.*—To a solution of 9.41 parts of 3-acetamidoestra-1,3,5(10),8(9)-tetraen-17-one in 1,064 parts of ethanol is added a solution of 9.41 parts of sodium borohydride in 380 parts of water, and the resulting reaction mixture is stirred for about 2 hours in a nitrogen atmosphere. The reaction mixture is then diluted with chloroform and washed several times with water. Drying over anhydrous sodium sulfate followed by distillation of the solvent under reduced pressure affords the crude product which is purified by recrystallization from ethanol to afford 3-acetamidoestra-1,3,5(10),8(9)-tetraen-17β-ol, identical with the product obtained according to the procedure of Method A.

*Example 22*

When an equivalent quantity of 2-methyl-2-(6-diethylamino-1-naphthyliden)ethylcyclopentane-1,3-dione is substituted in the procedure of Example 6, there is obtained 3-diethylaminoestra-1,3,5(10),8(9),14-pentaen-17-one.

*Example 23*

The substitution of an equivalent quantity of 2-ethyl-2-(6-dimethylamino-1-naphthyliden)ethylcyclopentane-1,3-dione in the procedure of Example 6 results in 3-dimethylamino-13β-ethylgona-1,3,5(10),8(9),14-pentaen-17-one.

*Example 24*

When an equivalent quantity of 2-methyl-2-(6-propionamido-1-naphthyliden)ethylcyclopentane-1,3-dione is substituted in the procedure of Example 18, there is obtained 3-propionamidoestra-1,3,5(10),8(9),14-pentaen-17-one.

*Example 25*

The substitution of an equivalent quantity of 2-methyl-2-(6-p-toluenesulfonylamido-1-naphthyliden)ethyl-cyclopentane-1,3-dione in the procedure of Example 18 results in 3-p-toluenesulfonylamidoestra-1,3,5(10),8(9)-14-pentaen-17-one.

*Example 26*

By substituting an equivalent quantity of 2-methyl-2-(6-methanesulfonylamido-1-naphthyliden)ethyl-cyclopentane-1,3-dione and otherwise proceeding according to the processes described in Example 18, there is obtained 3-methanesulfonylamidoestra-1,3,5(10),8(9),14-pentaen-17-one.

*Example 27*

By substituting an equivalent quantity of ethylene glycol and otherwise proceeding according to the processes described in Example 10, there is obtained 3-dimethylaminoestra-1,3,5(10),8(9)-tetraen-17-one 17-ethylene ketal.

*Example 28*

The reaction of equivalent quantities of 3-dimethylaminoestra-1,3,5(10),8(9),14-pentaen-17-one and ethylene glycol by the procedure described in Example 10 results in 3-dimethylaminoestra-1,3,5(10),8(9),14-pentaen-17-one 17-ethylene ketal.

What is claimed is:

1. A compound of the formula

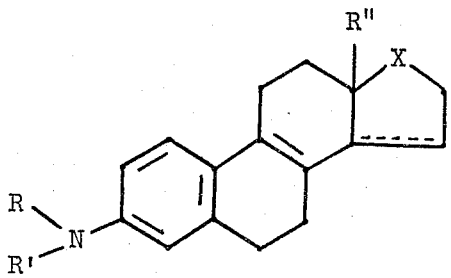

wherein R is selected from the group consisting of lower alkyl, lower alkanoyl and hydrocarbon-sulfonyl radicals, R' is selected from the group consisting of hydrogen and lower alkyl radicals, R" is a lower alkyl radical, R and R' together comprise the residue of a secondary cycloaliphatic amine, and X is selected from the group consisting of carbonyl, hydroxymethylene, (lower alkanoyl)oxymethylene, alkylenedioxymethylene and bis-(lower alkoxy)methylene radicals, and the dotted line indicates the optional presence of a 14,15-double bond.

2. 3-pyrrolidinoestra-1,3,5(10),8(9),14-pentaen-17-one.
3. 3-pyrrolidinoestra-1,3,5(10),8(9)-tetraen-17-one.
4. 3-pyrrolidinoestra-1,3,5(10),8(9),14-tetraen-17β-ol.
5. 3-pyrrolidinoestra-1,3,5(10),8(9)-tetraen-17β-ol.
6. 3-dimethylaminoestra-1,3,5(10),8(9),14-pentaen-17-one.
7. 3-dimethylaminoestra-1,3,5(10),8(9),14-pentaen-17-one 17-dimethyl ketal.
8. 3-dimethylaminoestra-1,3,5(10),8(9),14-pentaen-17β-ol.
9. 3-dimethylaminoestra-1,3,5(10),8(9)-tetraen-17-one.
10. 3-dimethylaminoestra-1,3,5(10),8(9)-tetraen-17β-ol.
11. 3-dimethylaminoestra-1,3,5(10),8(9),14-pentaen-17-one 17-diethyl ketal.
12. 3-dimethylaminoestra-1,3,5(10),8(9),14-pentaen-17β-ol 17-acetate.
13. 3-dimethylaminoestra-1,3,5(10),8(9)-tetraen-17β-ol 17-acetate.
14. 3-acetamidoestra-1,3,5(10),8(9),14-pentaen-17-one.
15. 3-acetamidoestra-1,3,5(10),8(9),14-pentaen-17β-ol.
16. 3-acetamidoestra-1,3,5(10),8(9)-tetraen-17-one.
17. 3-acetamidoestra-1,3,5(10),8(9)-tetraen-17β-ol.
18. 3-morpholinoestra-1,3,5(10),8(9),14-pentaen-17-one.

References Cited

UNITED STATES PATENTS 3,100,209    8/1963    Schwenk et al. _____ 260—397.3

OTHER REFERENCES

Ananchenko et al.: Tetrahedron Letters, 23, pages 1553–1558 (1963).

LEWIS GOTTS, *Primary Examiner.*

THOMAS M. MESHBESHER, *Assistant Examiner.*